W. J. AUSTIN.

RAIL JOINT AND METHOD OF FORMING SAME.

No. 11,653. Reissued Mar. 8, 1898.

Witnesses:
Geo. W. Young.
Chas. L. Goss.

Inventor:
William J. Austin
By E. M. McVicker,
Attorney.

UNITED STATES PATENT OFFICE.

WILLIAM J. AUSTIN, OF MILWAUKEE, WISCONSIN, ASSIGNOR TO THE MILWAUKEE RAIL JOINT AND WELDING COMPANY, OF SAME PLACE.

RAIL-JOINT AND METHOD OF FORMING SAME.

SPECIFICATION forming part of Reissued Letters Patent No. 11,653, dated March 8, 1898.

Original No. 593,345, dated November 9, 1897. Application for reissue filed December 3, 1897. Serial No. 660,719.

*To all whom it may concern:*

Be it known that I, WILLIAM J. AUSTIN, a citizen of the United States, residing at Milwaukee, county of Milwaukee, State of Wisconsin, have invented a certain new and useful Improvement in Rail-Joints and Method of Forming the Same; and I declare the following to be a full, clear, and exact description of the invention, such as will enable others skilled in the art to which it pertains to make and use the same, reference being had to the accompanying drawings, which form a part of this specification.

My invention relates to certain new and useful improvements in the construction of rail-joints and in methods of forming the same; and my said invention consists in the matters hereinafter described, and pointed out in the appended claims.

Figure 1:
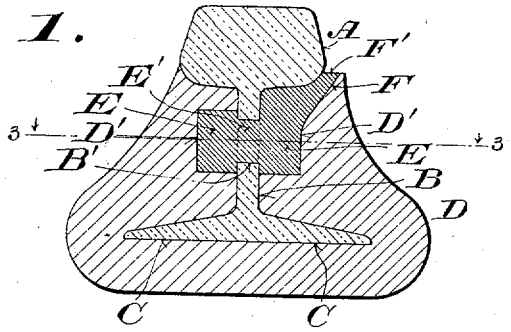
Figure 2:
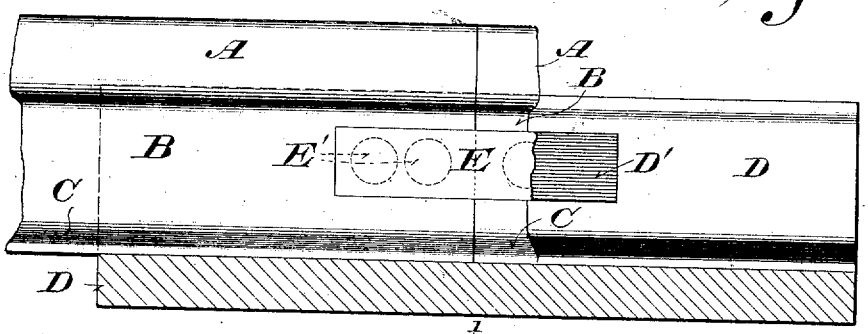
Figure 3:
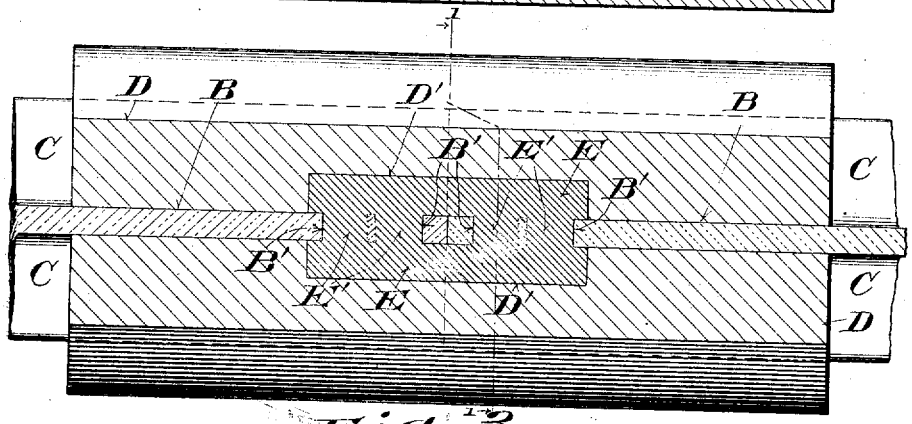

In the accompanying drawings, illustrating my invention, Figure 1 is a vertical cross-sectional view of a rail-joint embodying my invention, said section being taken on line 1 1 of Fig. 3. Fig. 2 is a view partly in section and partly in elevation of the same. Fig. 3 is a horizontal sectional view of the same, taken on line 3 3 of Fig. 1.

The object of my invention is to provide a simple, strong, and rigid connection between the ends of rails, the construction being such that the greater portion of the work may be done in a shop or foundry and the joining of the ends of the rails completed by pouring a comparatively small amount of molten metal into suitable cavities formed in the sleeve or support which serves to unite the rail ends.

Referring by letter to said drawings, A A designate the head portions of a pair of rail ends, B B the web portions of the same, and C C the base-flanges of the same.

D designates a sleeve or support made of any suitable shape on its exterior and shaped upon its inner surfaces so as to fit closely around and embrace the webs and base-flanges of the rail ends, so as to afford a strong support for the rail ends against any tendency to lateral or vertical displacement.

Upon the interior of the sleeve or support D is provided a suitably-shaped cavity or recess D′, preferably having its end walls arranged at right angles or approximately right angles to the length of the rails. The web portions of the rail ends are provided with apertures or holes B′ B′, two or more of which are conveniently formed in each rail end at such distance apart as to leave only thin dividing walls or partitions between them.

At one side of the sleeve or support D is arranged a suitable sprue-hole F, communicating with the interior of the recess or cavity D′ and through which molten metal may be poured into said recess or cavity.

The holes B′ B′ are arranged in such relation to the rail ends as to come within the cavity or recess D′ when the sleeve or support D is adjusted upon the ends of a pair of rails, as shown in the drawings.

My improved joint is applied to the ends of the rails in the following manner: The sleeve or support D is slipped over the ends of a pair of rails and adjusted so as to bring the center of the sleeve or support around the line of division between the rail ends. Molten metal is then poured into the sprue-hole F and fills the recess or cavity D′ and flows through the holes or apertures B′ B′ in the webs B. This body of cast metal thus serves to unite the rail ends to each other and to the sleeve or support D. The thin walls or partitions between the adjacent apertures or holes B′ B′ will be melted by the heat of the molten metal and fused thereto in an obvious manner.

It follows from the foregoing construction that when the recess or cavity D′ in the sleeve or support D has been filled with molten metal said metal will flow through the apertures or holes B′ B′ in the webs of the rail ends and will form a solid connecting-block E upon each side of said webs, with connecting bars or links E′ E′ extending through said apertures or holes, a projecting neck of metal F′ likewise filling the sprue-hole F, as in Fig. 1. It also follows that by reason of the thinness of the dividing walls or partitions between adjacent apertures or holes B′ B′ in the rail ends said partitions will be melted by the heat of the molten metal and fused thereto.

By the described construction the filling of metal will serve to effectually secure the rail ends in position within the sleeve or support D, the square or approximately square ends of said block of metal abutting squarely against the end walls of the recess or cavity in said sleeve or support and serving effectually to prevent longitudinal movement of the rail ends or either of them.

By the fusion of the partition-walls between the apertures or holes B′ B′ to the cast-metal filling-block E an electrical "bond" is established between the rail ends, thereby obviating the necessity of separately bonding the rails when used upon electric railroads.

My improved joint is very simple in its construction, affords a strong and rigid support for the rail ends, and makes a very satisfactory joint, serving in effect to make a practically continuous rail.

A main advantage gained by my improved device is that by my improvement the greater part of the work may be done in a shop or foundry and the sleeves or supports shipped in quantities to the localities where they are to be used, when all that is necessary to complete the joints is to adjust the sleeves or supports in position on the rail ends and pour into the cavities the described filling of molten metal.

The sleeve or support D may be of suitable metal.

I do not wish to be understood as limiting myself to the exact details of construction shown and described, as they may be modified in various ways without departing from the principle and intended scope of my in ention.

Having thus described my invention, what I claim as new, and desire to secure by Letters Patent of the United States, is—

1. A rail-joint comprising opposing rail ends, a recessed sleeve or support conforming to the rail ends, and a filling of cast metal fused with the rail ends and engaging with the sleeve or support.

2. A rail-joint comprising the proximate ends of rails provided with perforations through their webs; a sleeve or coupling partially encompassing the proximate ends of the rails; and a filling of cast metal extending through the perforations of the rails and engaging with the sleeve or coupling.

3. An improved rail-joint comprising a metal sleeve or support shaped on its interior to conform to and closely embrace a pair of rail ends and provided with an interior recess or cavity upon each side, a pair of rail ends fitting within said sleeve or support and provided with apertures in their webs, and a filling of cast metal flowed into said cavity or recess and through said apertures.

4. A method of joining rail ends consisting in adjusting upon a pair of alined rail ends a sleeve or support conforming to the contour of said rail ends and having a cavity or recess upon its interior and upon each side of the rail ends, and pouring molten metal into said cavity, and uniting the same to the webs of said rail ends by fusion.

5. A method of joining rail ends consisting in adjusting upon a pair of alined, and perforated and apertured rail ends a sleeve or support shaped upon its interior to conform to the contour of the rail ends and provided upon its interior with a cavity or recess, pouring molten metal into said cavity and through the perforations in the rail ends and fusing the partitions between said perforation to said cast-metal filling.

In testimony that I claim the foregoing as my own I affix my signature in the presence of two witnesses.

WILLIAM J. AUSTIN.

Witnesses:
FRANK N. WEBSTER,
E. M. MCVICKER.